(12) United States Patent
Yuan et al.

(10) Patent No.: US 10,050,781 B2
(45) Date of Patent: Aug. 14, 2018

(54) METHOD, APPARATUS, TERMINAL DEVICE AND SYSTEM FOR GENERATING SHARED KEY

(71) Applicant: Alibaba Group Holding Limited, George Town, Grand Cayman (KY)

(72) Inventors: Peng Yuan, Beijing (CN); Yingfang Fu, Beijing (CN); Shaojie Liu, Beijing (CN); Zhiqiang Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 184 days.

(21) Appl. No.: 15/241,668

(22) Filed: Aug. 19, 2016

(65) Prior Publication Data
US 2017/0054555 A1    Feb. 23, 2017

(30) Foreign Application Priority Data
Aug. 20, 2015  (CN) .......................... 2015 1 0516356

(51) Int. Cl.
*H04L 9/08* (2006.01)
*H04L 9/14* (2006.01)

(52) U.S. Cl.
CPC .......... *H04L 9/0838* (2013.01); *H04L 9/0852* (2013.01); *H04L 9/0869* (2013.01); *H04L 9/14* (2013.01)

(58) Field of Classification Search
CPC ... H04L 9/0838; H04L 9/0852; H04L 9/0869; H04L 9/14; H04L 63/061
See application file for complete search history.

(56) References Cited

U.S. PATENT DOCUMENTS

| | | | |
|---|---|---|---|
| 8,170,207 B2 | 5/2012 | Vanstone | |
| 8,171,302 B2 | 5/2012 | Broyles | |
| 8,261,076 B2 | 9/2012 | Abendroth et al. | |
| 8,280,046 B2 | 10/2012 | Rudolf et al. | |
| 8,284,937 B2 | 10/2012 | Akutsu et al. | |
| 8,448,235 B2 | 5/2013 | Langham et al. | |
| 8,484,469 B2 | 7/2013 | Li | |
| 8,526,607 B2 | 9/2013 | Liu et al. | |

(Continued)

FOREIGN PATENT DOCUMENTS

WO    2004098144    11/2004

OTHER PUBLICATIONS

Stallings, Cryptography and Network Security—Principles and Practices, 2011, 5th Edition, pp. 489-501.*

*Primary Examiner* — Minh Dinh

(57) ABSTRACT

Embodiments of the present application provide apparatus and methods for generating a shared key, including setting up a key negotiation connection, and determining an algorithm code by negotiating using the key negotiation connection. An algorithm corresponding to the algorithm code is retrieved from a pre-stored algorithm library, and a pre-stored seed key is calculated using the algorithm to obtain a shared key. Compared with traditional key generation methods, embodiments of the present invention avoid the problem of a high bit error rate that occurs in the traditional quantum key generation methods, especially quantum key generation methods. One exemplary method determines an algorithm code through negotiation, retrieves a pre-stored algorithm corresponding to the algorithm code, and generates a new shared key using a seed key.

17 Claims, 4 Drawing Sheets

(56) References Cited

U.S. PATENT DOCUMENTS

| | | |
|---|---|---|
| 8,918,648 B2 | 12/2014 | Brown et al. |
| 9,077,521 B2 | 7/2015 | Machani |
| 9,088,557 B2 | 7/2015 | Aoyagi et al. |
| 9,106,882 B2 | 8/2015 | Yamaguchi et al. |
| 9,112,680 B2 | 8/2015 | Baentsch et al. |
| 9,161,215 B2 | 10/2015 | Kato et al. |
| 9,231,759 B2 | 1/2016 | Chan et al. |
| 2005/0050328 A1 | 3/2005 | Mizrah |
| 2007/0022475 A1* | 1/2007 | Rossi ................. H04L 63/0428 726/14 |
| 2007/0204160 A1* | 8/2007 | Chan .................... H04L 9/0841 713/171 |
| 2009/0041251 A1 | 2/2009 | Abendroth et al. |
| 2009/0327798 A1 | 12/2009 | D'Amato et al. |
| 2010/0115278 A1 | 5/2010 | Shen et al. |
| 2010/0135499 A1 | 6/2010 | Chang et al. |
| 2010/0183150 A1 | 7/2010 | Lee et al. |
| 2010/0257362 A1 | 10/2010 | Ramzan et al. |
| 2010/0293380 A1 | 11/2010 | Wiseman et al. |
| 2012/0027205 A1 | 2/2012 | Liu et al. |
| 2012/0036363 A1 | 2/2012 | Langham et al. |
| 2012/0096278 A1 | 4/2012 | Brokenshire et al. |
| 2012/0159587 A1 | 6/2012 | Ge et al. |
| 2012/0257745 A1 | 10/2012 | Vanstone |
| 2015/0100781 A1 | 4/2015 | Yann et al. |
| 2015/0288667 A1* | 10/2015 | Alder .................... H04L 63/061 713/171 |
| 2015/0358157 A1 | 12/2015 | Zhang et al. |
| 2016/0099920 A1 | 4/2016 | Meuleman et al. |
| 2016/0099922 A1 | 4/2016 | Dover |

* cited by examiner

METHOD, APPARATUS, TERMINAL DEVICE AND SYSTEM FOR GENERATING SHARED KEY

CROSS-REFERENCE TO RELATED APPLICATIONS

This application claims priority to Chinese Patent Application No. 201510516356.5, filed on Aug. 20, 2015, which is incorporated herein by reference in its entirety.

TECHNICAL FIELD

Embodiments of the present invention relate to the field of information security, and more specifically, to methods and devices for generating shared keys.

BACKGROUND

In cryptography, a private key password mechanism and a public key password mechanism are used to provide security, ensure integrity and non-repudiation of identity information in communications, and resist identity impersonation attacks. In a public key infrastructure, identity authentication is achieved mainly using digital signature technology and public key password mechanisms. Common digital signature algorithms include RSA algorithms, ECC algorithms, DSA algorithms, ElGamal algorithms, etc. These algorithms provide security using classical authentication techniques based on computing complexity, which may be cracked or otherwise compromised when used in quantum computing and cloud computing environments.

Quantum cryptography is a product of quantum mechanics and cryptography, and provides security based on the basic principle of quantum mechanics, including the uncertainty principle of unknown quantum states, the principle of collapse after measurement and the no-cloning principle. Quantum cryptography provides unconditional security and detectability from eavesdroppers, regardless of computing capability and storage capability of an attacker. However, quantum key distribution protocols currently use a shared key based on a bit error rate. This introduces a problem of insufficient key distribution in large-scale enterprise scenarios, and the shared key negotiation process of a quantum key is greatly affected by external interference and must rely on the bit error rate to determine the output of a quantum key. The yield of actual quantum keys is limited due to the absence of an effective bit error rate estimation method.

SUMMARY

Embodiments of the present invention provide apparatus and methods for generating a shared key.

According to one embodiment, a method for generating a shared key using a sender is disclosed. The method includes establishing a key negotiation connection between the sender and a receiver, determining an algorithm code by negotiating with the receiver using the key negotiation connection, searching for an algorithm corresponding to the algorithm code in a pre-stored algorithm library, and calculating a shared key using the algorithm, where a seed key is used as a parameter of the algorithm.

According to another embodiment, an apparatus for generating a shared key is disclosed. The apparatus includes a main memory and a processor communicatively coupled to the main memory that establishes a key negotiation connection between a sender and a receiver, determines an algorithm code by negotiating with the receiver using the key negotiation connection, searches for an algorithm corresponding to the algorithm code in a pre-stored algorithm library, and calculates a shared key using the algorithm and a pre-stored seed key, where the pre-stored key is a parameter of the algorithm.

According to another embodiment, an apparatus for generating a shared key is disclosed. The apparatus includes a main memory and a processor communicatively coupled to the main memory that establishes a key negotiation connection between a receiver and a sender, determines an algorithm code by negotiating with the sender using the key negotiation connection, searches for an algorithm corresponding to the algorithm code in a pre-stored algorithm library, calculates a shared key using the algorithm and a pre-stored seed key, where the pre-stored seed key is used as a parameter of the algorithm, sends response information to the sender indicating that said key negotiation request is agreed to, and determines the validity of the sender based on the authentication information of the sender in the key negotiation request

DETAILED DESCRIPTION

Many specific details are described in the following description to facilitate a full understanding of the present application. However, the present application can be implemented in other manners, different from those described herein, and those skilled in the art can make similar variations without departing from the scope of the present application. The present application is not limited by specific implementations disclosed below.

Figure 1:
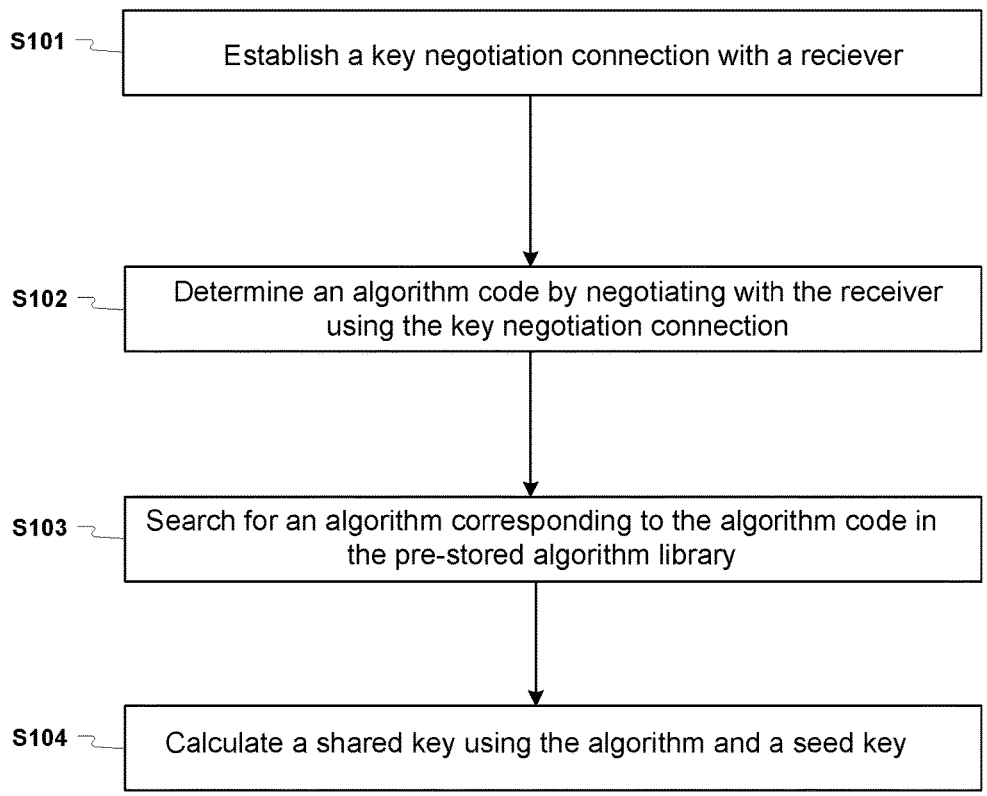
FIG. 1 is a flow chart depicting an exemplary sequence of computer-implemented steps for performing a method for generating a shared key according to embodiments of the present invention.

Referring to FIG. 1, a flow chart depicting an exemplary sequence of computer implemented steps for performing a method for generating a shared key by a sender is depicted according to embodiments of the present invention. The method includes the following steps:

Step S101: A key negotiation connection is established with a receiver. The process of setting up the key negotiation connection with the receiver is similar to a communication handshake, where both parties (the sender and the receiver) set up a communication connection through mutual exchange of information to perform subsequent data communications.

According to some embodiments, the step of setting up a key negotiation connection with a receiver includes sending a key negotiation request to the receiver, and receiving response information indicating that the receiver agrees to the key negotiation request and that the key negotiation connection is successfully established.

In order to provide security for the key negotiation connection, according to some embodiments, the sender performs identity authentication when setting up the key negotiation connection with the receiver. In this case, the key negotiation request includes sender authentication information that provides identity information of the sender and a certificate of the sender. After receiving the key negotiation request sent by the sender, the receiver will authenticate the sender authentication information in the key negotiation request to determine if the sender is valid. If the sender is not valid, the key negotiation flow terminates. If the sender is valid, response information indicating that the key negotiation request is successful is sent to the sender. If the sender receives the response information indicating that the receiver agrees with the key negotiation request, the sender indicates that the receiver has passed identity authentication, the key negotiation connection is set up successfully, and subsequent key negotiations may be performed.

According to some embodiments, the response information includes receiver authentication information that provides identity information of the receiver and a certificate of the receiver. After receiving response information indicating that the receiver agrees with the key negotiation request, the sender will authenticate the receiver according to the receiver authentication information to determine if the receiver is valid. If the receiver is not valid, the key negotiation flow terminates. If the receiver is valid, the key negotiation connection is established successfully, and subsequent key negotiations may be performed.

According to some embodiments, the key negotiation request and the response information are transmitted using an encrypted communication channel (e.g., https) to provide additional security.

Step S102: An algorithm code is determined or acquired by negotiating with the receiver using the key negotiation connection.

According to some embodiments, a seed key and an algorithm library are pre-stored at both the sender and the receiver, where the algorithm library includes multiple algorithms for modifying the seed key. To avoid leakage of the algorithms during the negotiation process, a different algorithm code may be assigned for each algorithm, and an algorithm is selected by negotiating the algorithm code during the negotiation process. Determining an algorithm code by negotiating with the receiver using the key negotiation connection may include: sending an algorithm code to the receiver using the key negotiation connection; receiving information indicating whether or not the algorithm code sent to the receiver is agreed to from the receiver; and, if the algorithm code is agreed to, using the algorithm code. If the algorithm code is not agreed to, determining an algorithm code by negotiating with the receiver using the key negotiation connection may further include: sending other algorithm codes to the receiver until an algorithm code is agreed to; or receiving a recommended algorithm code from the receiver, acknowledging the recommended algorithm code, and sending information to the receiver indicating that the recommended algorithm code is employed.

According to some embodiments, to further strengthen security when determining an algorithm code by negotiating with the receiver using the key negotiation connection, and to avoid leakage of the algorithm code, when determining an algorithm code by negotiating with the receiver using the key negotiation connection, information transmitted is encrypted using a preset key. Sending an algorithm code to the receiver using the key negotiation connection includes encrypting the algorithm code using a preset key, and sending the encrypted algorithm code to the receiver using the key negotiation connection. After the receiver receives the encrypted algorithm code, the algorithm code is obtained by decrypting the encrypted algorithm code using a corresponding key. The receiver will also perform encryption when sending a recommended algorithm code, and after receiving the encrypted recommended algorithm code, the sender also performs decryption using a corresponding key to obtain the recommended algorithm code.

Step S103: An algorithm (e.g., a shared key=f (seed key)) corresponding to the algorithm code is retrieved from a pre-stored algorithm library.

Step S104: The sender uses a pre-stored seed key as a parameter of the algorithm to obtain a shared key. The receiver also uses a pre-stored seed key and the algorithm to obtain the same shared key, and after a shared key is generated at both the sender and the receiver, secure transmission of data may be performed using the shared key.

According to some embodiments, a quantum key is generated using a quantum seed key and an algorithm negotiated by both parties, where a new quantum key can be generated. The negotiation process does not necessarily relate to the content of the quantum seed key, which enhances security and avoids the problem of a high bit error rate inherent to traditional quantum key generation methods, and enables a high key generation success rate.

In order to further improve security of the method for generating a shared key by a sender, according to some embodiments, a random number is used to generate the shared key. For example, the following function may be used: shared key=f (seed key, n), wherein n is a random number. The sender determines the random number through negotiation and determines an algorithm code using the key negotiation connection with a receiver. In this way, even if the algorithm and the algorithm code are leaked, the quantum key will not be leaked or cracked as long as the random number is not leaked, thereby enhancing the security of the method.

According to some embodiments, the method for generating a shared key by a sender further includes determining a random number by negotiating with the receiver through the key negotiation connection, and the calculating a shared key using a pre-stored seed key and the algorithm includes calculating the pre-stored seed key using the algorithm and the random number to obtain a shared key, where the random number is used as a parameter of the algorithm.

The step of determining a random number by negotiating with the receiver through the key negotiation connection includes: sending a random number to the receiver using the key negotiation connection, and receiving information indicating whether or not the random number is agreed to by the receiver. If the random number is agreed to, the random number is used. If the random number is not agreed upon, additional random numbers are sent to the receiver until a random number is agreed to, or a recommended random number is received from the receiver. The recommended random number is acknowledged, and information indicating that the recommended random number will be used is sent to the receiver.

According to some embodiments, to further strengthen security when determining a random number by negotiating with the receiver using the key negotiation connection, and to avoid leakage of the random number, for determining a random, information transmitted is encrypted using a preset key. The step of sending a random number to the receiver using the key negotiation connection includes encrypting the random number using a preset key, and sending the encrypted random number to the receiver using the key negotiation connection. After the receiver receives the encrypted random number, the random number can be obtained by decrypting the encrypted random number using a corresponding key. The receiver will also perform encryption when sending a recommended random number, and after receiving the encrypted recommended random number, the sender also performs decryption using a corresponding key to obtain the recommended random number.

Figure 2:
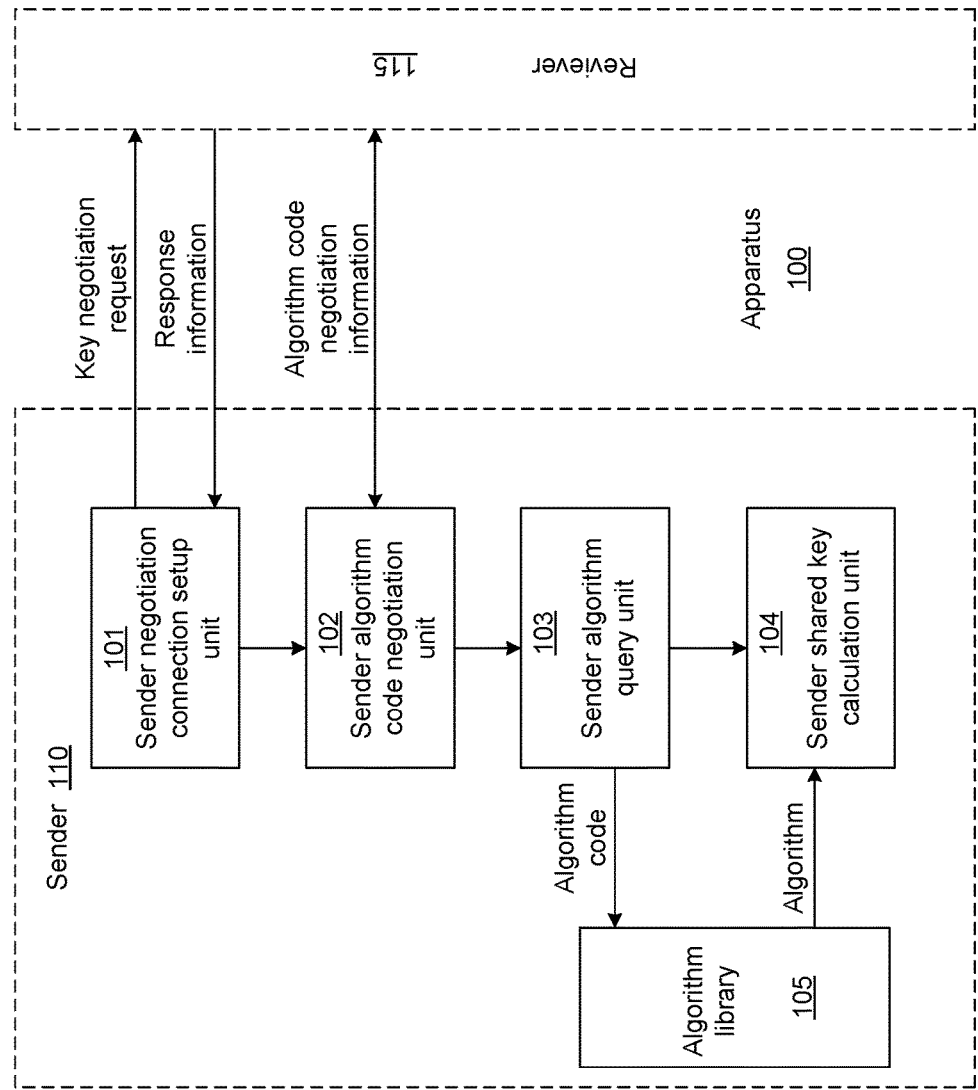
FIG. 2 is a block diagram of an exemplary apparatus for generating a shared key by a sender according to embodiments of the present invention.

Referring to FIG. 2, a schematic diagram of an apparatus 100 for generating a shared key by a sender is depicted according to embodiments of the present invention. The apparatus 100 is similar to the method already described, and is described in a simpler way. Reference can be made to the corresponding description in the method embodiment for related contents thereof.

The apparatus 100 for generating a shared key by a sender includes: a sender negotiation connection setup unit 101 for setting up a key negotiation connection with a receiver; a sender algorithm code negotiation unit 102 for determining an algorithm code by negotiating with the receiver using the key negotiation connection; a sender algorithm query unit 103 for searching for an algorithm corresponding to the algorithm code in a pre-stored algorithm library 105; and a sender shared key calculation unit 104 for obtaining a shared key using a pre-stored seed and the algorithm.

According to some embodiments, the sender negotiation connection setup unit 101 includes a negotiation request sending sub-unit used for sending a key negotiation request to the receiver, and a response information receiving sub-unit used for receiving response information indicating that the receiver agrees with the key negotiation request. At this point, the key negotiation connection has been set up successfully.

According to some embodiments, the response information receiving sub-unit includes a first response information receiving sub-unit for receiving response information indicating that the receiver agrees with the key negotiation request, and a receiver validity judgment sub-unit used for judging validity of the receiver according to authentication information of the receiver in the response information. If it is determined that the receiver is valid, the key negotiation connection is established successfully.

According to some embodiments, the sender algorithm code negotiation unit 102 includes: an algorithm code sending sub-unit for sending an algorithm code to the receiver using the key negotiation connection; a code information receiving sub-unit for receiving information indicating whether or not the algorithm code is agreed to by the receiver; and a sender algorithm code determination sub-unit for determining the algorithm code to be used as an algorithm code when the code information receiving sub-unit receives information indicating that the algorithm code is agreed to by the receiver.

According to some embodiments, the sender algorithm code negotiation unit 102 further includes an algorithm code retry sending sub-unit used for, when the code information receiving sub-unit receives information indicating that the algorithm code is not agreed to by the receiver, sending another algorithm code to the receiver until the another algorithm code is agreed to, or a recommended algorithm code receiving sub-unit used for receiving an algorithm code recommended by the receiver, acknowledging the recommended algorithm code, and sending information indicating that the recommended algorithm code is employed, to the receiver.

According to some embodiments, the algorithm code sending sub-unit includes, an algorithm code encryption sub-unit used for encrypting the algorithm code using a preset key, and an encrypted code sending sub-unit for sending the encrypted algorithm code to the receiver using the key negotiation connection.

According to some embodiments, the apparatus for generating a shared key by a sender further includes a sender random number negotiation unit used for generating a random number by negotiating with the receiver using the key negotiation connection, and the sender shared key calculation unit includes a sender shared key calculation sub-unit for obtaining a shared key using the algorithm and the random number, where the random number is used as a parameter of the algorithm.

According to some embodiments, the sender random number negotiation unit includes a random number sending sub-unit used for sending a random number to the receiver using the key negotiation connection, and a random number information receiving sub-unit used for receiving information indicating whether or not the random number is agreed to from the receiver.

According to some embodiments, the sender random number negotiation unit further includes a random number retry sending sub-unit used for sending additional random numbers to the receiver until one of the random numbers is agreed to, and/or a recommended random number receiving sub-unit used for receiving a recommended random number from the receiver, and acknowledging the recommended random number will be used.

According to some embodiments, the random number sending sub-unit includes a random number encryption sub-unit used for encrypting the random number using a preset key, and an encrypted random number sending sub-unit used for sending the encrypted random number to the receiver using the key negotiation connection.

According to some embodiments, the seed key is a quantum seed key.

Figure 3:
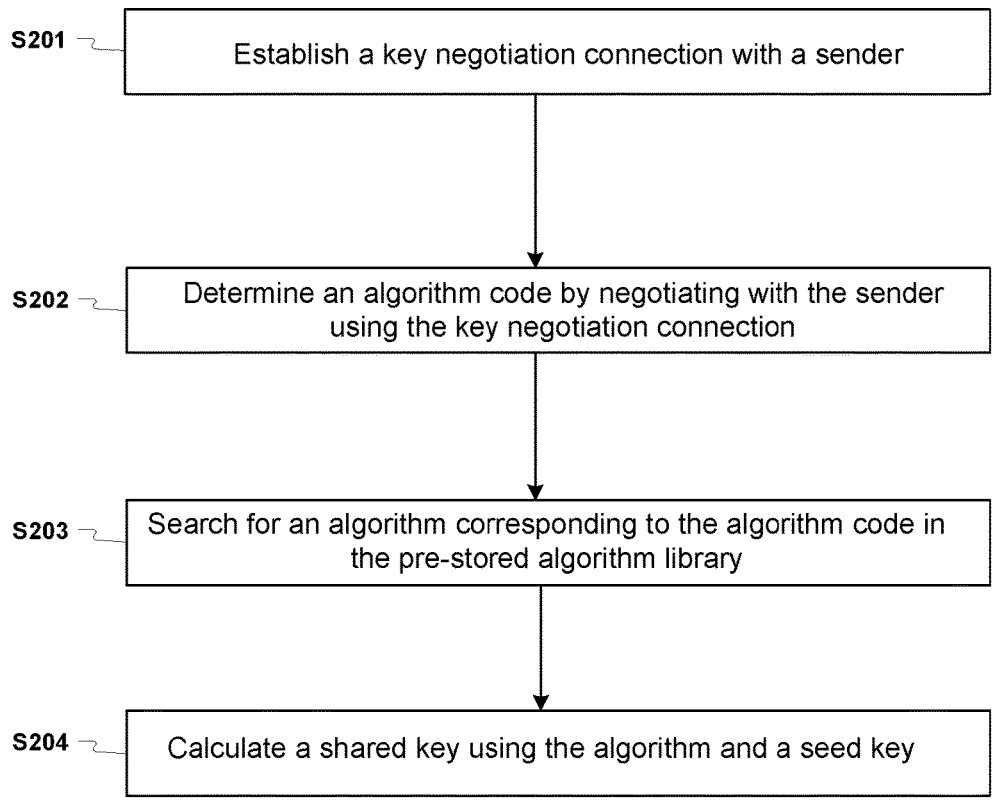
FIG. 3 is a flow chart depicting an exemplary sequence of computer-implemented steps for performing a method for generating a shared key by a receiver according to embodiments of the present invention.

Referring to FIG. 3, a flow chart of an exemplary sequence of computer implemented steps for performing a method for generating a shared key by a receiver is depicted according to embodiments of the present invention. The method includes the following steps:

Step S201: A key negotiation connection is set up with a sender. The process of setting up a key negotiation connection with a sender is similar to a communication handshake, where both parties (the sender and the receiver) set up a communication connection using mutual exchange of data to conduct a subsequent data communication.

According to some embodiments, the step of setting up a key negotiation connection with a sender includes receiving a key negotiation request sent by the sender, and sending response information to the sender indicating that the key negotiation request is agreed to and that the key negotiation connection has been set up successfully.

To improve the security of the key negotiation connection, according to some embodiments, the sender performs identity authentication when setting up a key negotiation connection with a receiver. Therefore, the key negotiation request includes sender authentication information that provides identity information of the sender and a certificate of the sender. The receiver will authenticate the sender authentication information in the key negotiation request to determine the validity of the sender. If the sender is not valid, the key negotiation flow terminates. If the sender is valid, response information indicating that the key negotiation request is agreed to will be sent to the sender. If the sender receives the response information indicating that the receiver agrees to the key negotiation request, the sender indicates that the receiver has passed the key negotiation request.

According to some embodiments, the response information includes receiver authentication information that provides identity information of the receiver and a certificate of the receiver. After receiving response information indicating that the receiver agrees with the key negotiation request, the sender will authenticate the receiver using the receiver authentication information. If the receiver is not valid, the key negotiation flow terminates. If the receiver is valid, acknowledgment information is sent to the receiver, and when the receiver receives the acknowledgment information, the receiver indicates that the receiver has passed the identity authentication. The key negotiation connection is determined to be successfully established, and further key negotiations may be carried out.

According to some embodiments, the key negotiation request and the response information are transmitted using an encrypted communication channel (e.g., https), to ensure the security of the information transmission.

Step S202: An algorithm code is determined by negotiating with the sender using the key negotiation connection.

According to some embodiments, the same seed key and algorithm library are pre-stored in both the sender and the receiver, and the algorithm library includes multiple algorithms for modifying the seed key to avoid leakage of the algorithms during the negotiation process. A different algorithm code is assigned to each of the algorithms, and the algorithm to be used is determined by negotiating the algorithm code during the negotiation process. The determining an algorithm code by negotiating with the sender using the key negotiation connection includes: receiving an algorithm code sent by the sender using the key negotiation connection; determining if the algorithm code is agreed to; if the algorithm code is agreed to, sending information to the sender indicating that the algorithm code is agreed to; and using the algorithm code.

If the algorithm code is not agreed to, a recommended algorithm code is sent to the sender. After information indicating that the recommended algorithm code is agreed to is received, the recommended algorithm code is acknowledged and employed.

According to some embodiments, to enhance security when determining an algorithm code by negotiating with the sender using the key negotiation connection, and to avoid leakage of the algorithm code, transmitted information is encrypted with a preset key. The step of receiving an algorithm code sent by the sender using the key negotiation connection includes receiving an algorithm code encrypted with a preset key from the sender, and decrypting the algorithm code. After the receiver receives the encrypted algorithm code, an algorithm code can be obtained by decrypting the encrypted algorithm code with a corresponding key. During the negotiation process, the receiver will also carry out encryption when sending a recommended algorithm code, and after receiving the encrypted recommended algorithm code, the sender also decrypts the encrypted recommended algorithm code using a corresponding key to obtain the recommended algorithm code.

Step S203: An algorithm corresponding to the algorithm code is retrieved from a pre-stored algorithm library.

Step S204: A pre-stored seed key is used as a parameter of the algorithm (e.g., shared key=f (seed key)) to obtain a shared key.

According to some embodiments, steps S201 through S204 may be used to generate a quantum key using a quantum seed key, and a new quantum key can be generated using a quantum seed key and an algorithm identified by both parties during negotiation. The negotiation process does not relate to the content of the quantum seed key, which enhances security and prevents the high bit error rate problem of traditional quantum key generation methods. The method has a high key generation success rate, and can meet the demands of large-scale businesses.

In order to further improve security of the method for generating a shared key using a receiver, according to some embodiments of the present application, a parameter of the algorithm used includes a random number. For example, the algorithm may include: shared key=f (seed key, n), wherein n is a random number. The sender also determines the random number during negotiation when determining an algorithm code by negotiating with the receiver using the key negotiation connection. In this way, even if the algorithm and the algorithm code are leaked, the quantum key will not be leaked or cracked as long as the random number is not leaked.

According to some embodiments, the method for generating a shared key by a receiver further includes determining a random number by negotiating with the sender using the key negotiation connection, and the obtaining a shared key using a pre-stored seed key and the algorithm includes obtain a shared key using the pre-stored seed key, the algorithm, and the random number. The step of determining a random number by negotiating with the sender using the key negotiation connection includes: receiving, using the key negotiation connection, a random number sent by the sender; determining if the random number is agreed to; when the random number is agreed to, sending to the sender information indicating that the random number is agreed to; and using the random number as a parameter of the algorithm. When the random number is not agreed to, a recommended random number is sent to the sender, and after information is received indicating that the recommended random number will be used, acknowledging that the recommended random number will be used as a parameter of the algorithm.

According to some embodiments, to further improve security when determining a random number by negotiating with the sender using the key negotiation connection, and to avoid leakage of the random number, when determining a random number by negotiating with the sender using the key negotiation connection, transmitted information is encrypted using a preset key. The step of receiving, using the key negotiation connection, a random number sent by the sender includes receiving, using the key negotiation connection, a random number encrypted using a preset key from the sender, and decrypting the random number using the preset key to obtain the random number. After the receiver receives the encrypted random number, the random number can be obtained by decrypting the encrypted random number using a corresponding key. The receiver will also perform encryption when sending a recommended random number, and after receiving the recommended encrypted random number, the sender performs decryption using the corresponding key to obtain the recommended random number.

Figure 4:
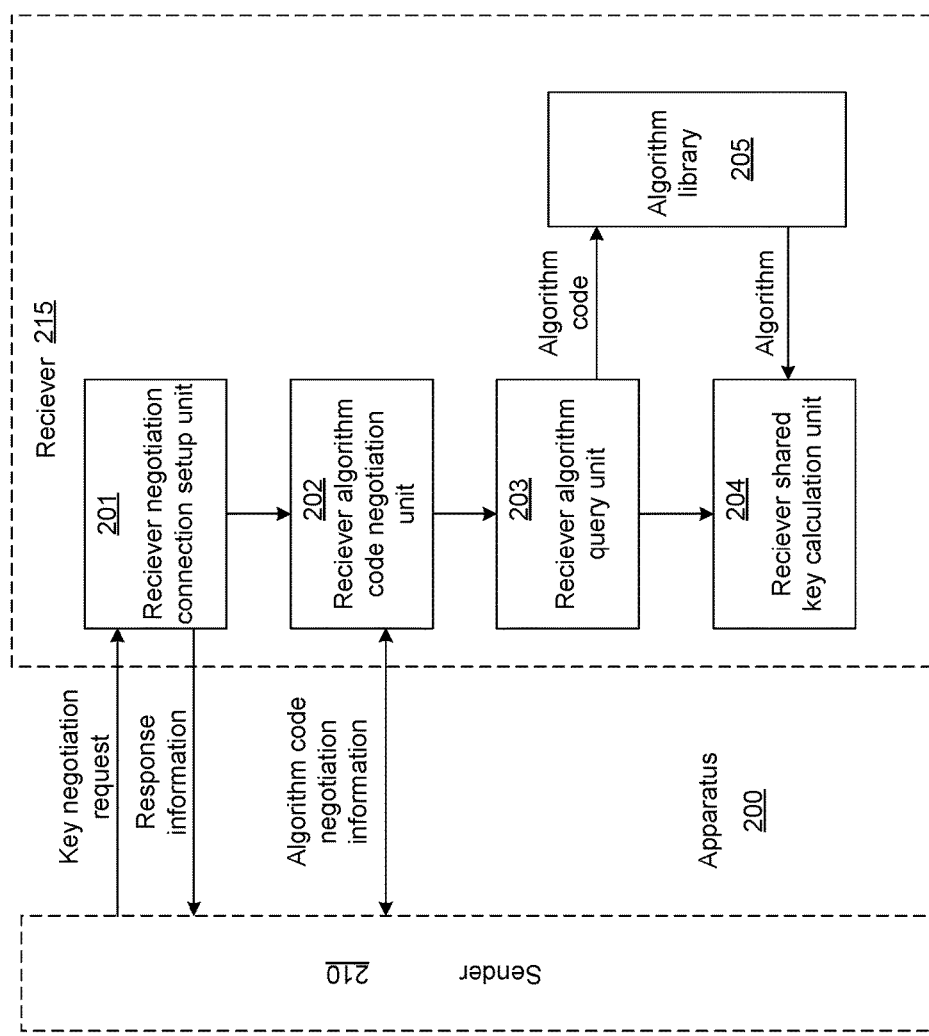
FIG. 4 is a block diagram of an exemplary apparatus for generating a shared key by a receiver according to embodiments the present invention.

Embodiments of methods for generating a shared key by a receiver have been described, and corresponding thereto, the present application further provides an apparatus for generating a shared key by a receiver. Referring to FIG. 4, a schematic diagram of an exemplary apparatus 200 for generating a shared key by a receiver is depicted according embodiments of the present invention. Reference can be made to the corresponding description in the method embodiment for related contents thereof.

Apparatus 200 for generating a shared key by a receiver includes: a receiver negotiation connection setup unit 201 for setting up a key negotiation connection with a sender; a receiver algorithm code negotiation unit 202 for determining an algorithm code by negotiating with the sender using the key negotiation connection; a receiver algorithm query unit 203 for searching for an algorithm corresponding to the algorithm code in a pre-stored algorithm library; and a receiver shared key calculation unit 204 for calculating a shared key using a pre-stored seed key and the algorithm.

According to some embodiments, the receiver negotiation connection setup unit 201 includes a negotiation request receiving sub-unit for receiving a key negotiation request sent by the sender, and a response information sending sub-unit for sending to the sender response information indicating that the key negotiation request is agreed to.

According to some embodiments, the response information sending sub-unit includes a sender validity sub-unit used for determining the validity of the sender based on authentication information of the sender included in the key negotiation request, and a first response information sending sub-unit used for, when the sender validity judgment sub-unit determines that the sender is valid, sending response information to the sender indicating that the key negotiation request is agreed to.

According to some embodiments, the receiver algorithm code negotiation unit 202 includes: an algorithm code receiving sub-unit for receiving, using the key negotiation connection, an algorithm code sent by the sender; an algorithm code judgment sub-unit for determining if the algorithm code is agreed to; a code information sending sub-unit for, when the algorithm code is agreed to, sending information to the sender indicating that the algorithm code is agreed; and a receiver algorithm code determination sub-unit used for selecting the algorithm code to be used.

According to some embodiments, the receiver algorithm code negotiation unit 202 further includes a recommended algorithm code sending sub-unit for sending a recommended algorithm code to the sender when the algorithm code is not agreed to, and a recommended algorithm code acknowledgement sub-unit for acknowledging the recommended algorithm code.

According to some embodiments, the algorithm code receiving sub-unit includes an encrypted algorithm code receiving sub-unit for receiving an algorithm code encrypted using a preset key sent by the sender using the key negotiation connection, and an encrypted algorithm code decryption sub-unit used for decrypting the algorithm code using the preset key to obtain an algorithm code.

According to some embodiments, the apparatus for generating a shared key by a receiver further includes a receiver random number negotiation unit for determining a random number by negotiating with the sender using the key negotiation connection, and the receiver shared key calculation unit includes a receiver shared key calculation sub-unit for calculating a shared key using the pre-stored seed key, the algorithm and the random number.

According to some embodiments, the receiver random number negotiation unit includes: a random number receiving sub-unit for receiving a random number sent by the sender using the key negotiation connection; a random number judgment sub-unit for determining if the random number is agreed to; a random number information sending sub-unit for sending information to the sender indicating that the random number is agreed to; and a receiver random number determination sub-unit used for selecting the random number to be used as the random number for the algorithm.

According to some embodiments, the receiver random number negotiation unit further includes a recommended random number sending sub-unit for sending a recommended random number to the sender, and a recommended random number acknowledgement sub-unit for acknowledging that the recommended random number will be used with the algorithm.

According to some embodiments, the random number receiving sub-unit includes an encrypted random number receiving sub-unit for receiving, using the key negotiation connection, a random number encrypted with a preset key from the sender, and an encrypted random number decryption sub-unit for decrypting the random number encrypted with the preset key using the preset key to obtain the random number.

According to some embodiments, the seed key is a quantum seed key.

According to some embodiments, a terminal device for generating a shared key by a sender is described, including: a central processing unit; an input/output unit; and a memory, where a method for generating a shared key by a sender is stored in the memory; and the memory and central processing unit are capable of executing the method. As the terminal device for generating a shared key by a sender uses a method for generating a shared key by a sender, reference can be made to the description of the embodiment of the method for generating a shared key by a sender for the related content.

The present application further provides a terminal device for generating a shared key by a receiver, including: a central processing unit; an input/output unit; and a memory, where the method for generating a shared key by a receiver according to the present application is stored in the memory, and the memory and central processing unit are capable of executing the method.

As the terminal device for generating a shared key by a receiver uses a method for generating a shared key by a receiver, reference can be made to the description of the embodiment of the method for generating a shared key by a receiver for the related content thereof.

The present invention further provides a system for generating a shared key, including a sender and a receiver, wherein the sender is configured to generate a shared key using a sender according to embodiments of the present application, and the receiver is configured to generate a shared key using a receiver according to embodiments of the present application.

As the sender of the system is configured to generate a shared key by a sender according to the present application, and the receiver is configured to generate a shared key using a receiver according to embodiments of the present application, reference can be made to the description of the embodiment of the apparatus for generating a shared key by a sender and the description of the embodiment of the apparatus for generating a shared key by a receiver, respectively, for the related contents thereof.

Although the present application has been disclosed as above with preferred embodiments, the embodiments are not used to define the present application, any person skilled in the art can make possible variations and modifications without departing from the spirit and scope of the present application, and thus the protection scope of the present application should be subject to the scope defined by the claims of the present application.

In a typical configuration, a computing device includes one or more central processing units (CPUs), an input/output interface, a network interface, and a memory.

The memory may include a volatile memory, a random access memory (RAM) and/or a non-volatile memory and other forms in a computer readable medium, for example, a read-only memory (ROM) or a flash RAM. The memory is an example of the computer readable medium.

The computer readable medium includes non-volatile and volatile, removable and non-removable media, and can use any method or technology to store information. The information may be a computer readable instruction, a data structure, a module of a program or other data. Examples of storage mediums of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission mediums, which can be used for storing computer accessible information. According to the definition herein, the computer readable medium does not include transitory media, for example, a modulated data signal and a carrier.

As will be appreciated by persons skilled in the art, the embodiments of the present application may be embodied as a method, a system or a computer program product. Accordingly, the present application may take the form of an entire hardware embodiment, an entire software embodiment or an embodiment combining software and hardware aspects. Furthermore, the present application may take the form of a computer program product implemented on one or more computer available storage mediums (including, but not limited to, magnetic disk memories, CD-ROMs, optical memories, etc.) including computer available program codes.

The invention claimed is:

1. A method for generating a shared key, the method comprising:
    establishing a key negotiation connection between a pair of terminals;
    determining an algorithm code by negotiating between the pair of terminals using the key negotiation connection, the determining including:
        sending the algorithm code from a first terminal to a second terminal of the pair of terminals using the key negotiation connection, the sending including:
            encrypting the algorithm code using a preset key to generate an encrypted algorithm code; and
            sending the encrypted algorithm code to the second terminal using the key negotiation connection;
        receiving information indicating if the algorithm code is agreed to from the second terminal; and
        selecting the algorithm code when the algorithm code is agreed to;
    searching for an algorithm corresponding to the algorithm code in a pre-stored algorithm library; and
    calculating a shared key using the algorithm, wherein a seed key is used as a parameter of the algorithm.

2. The method of claim 1, wherein the establishing a key negotiation connection comprises:
    sending a key negotiation request to the second terminal; and
    receiving response information indicating that the second terminal agrees with the key negotiation request.

3. The method of claim 2, wherein the response information comprises authentication information, and the receiving response information indicating that the second terminal agrees with the key negotiation request comprises determining that the second terminal is valid based on the authentication information.

4. The method of claim 1, further comprising:
    receiving a recommended algorithm code from the second terminal;
    acknowledging the recommended algorithm code; and
    sending to the second terminal information indicating that the recommended algorithm code is being used.

5. The method of claim 1, further comprising determining a random number by negotiating with the second terminal using the key negotiation connection, wherein calculating a shared key using the algorithm comprises calculating the shared key using the algorithm and the random number, wherein the random number is a parameter of the algorithm.

6. The method of claim 5, wherein the determining a random number by negotiating with the second terminal using the key negotiation connection comprises:
    receiving information indicating if the random number is agreed to by the second terminal; and
    selecting the random number when the random number is agreed to.

7. The method of claim 6, further comprising:
    receiving a recommended random number from the second terminal;
    acknowledging the recommended random number; and
    sending information to the second terminal indicating that the recommended random number is being used.

8. The method of claim 6, wherein the sending a random number to the second terminal using the key negotiation connection comprises:
    encrypting the random number using a preset key; and
    sending the encrypted random number to the second terminal using the key negotiation connection.

9. The method of claim 8, wherein the seed key is a quantum seed key.

10. An apparatus for generating a shared key, comprising:
    a main memory; and
    a processor communicatively coupled to the main memory that
        establishes a key negotiation connection between a pair of terminals,
        determines an algorithm code by negotiating between the pair of terminals using the key negotiation connection, determining the algorithm code to include:
            sending the algorithm code from a first terminal to a second terminal of the pair of terminals using the key negotiation connection, sending the algorithm code to include:
                encrypting the algorithm code using a preset key to generate an encrypted algorithm code; and
                sending the encrypted algorithm code to the second terminal using the key negotiation connection;
            receiving information indicating if the algorithm code is agreed to from the second terminal; and
            selecting the algorithm code when the algorithm code is agreed to;
        searches for an algorithm corresponding to the algorithm code in a pre-stored algorithm library, and calculates a shared key using the algorithm and a pre-stored seed key, wherein the pre-stored key is a parameter of the algorithm.

11. The apparatus of claim 10, wherein the processor sends a key negotiation request to the second terminal, and receives response information, wherein the response information indicates that the second terminal agrees with the key negotiation request.

12. The apparatus of claim 11, wherein the processor determines if the second terminal is valid based on the authentication information of the second terminal, wherein the key negotiation connection is established when the second terminal is determined to be valid.

13. The apparatus of claim 10, wherein the processor sends additional algorithm codes to the second terminal until at least one of the additional algorithm codes is agreed to by the second terminal.

14. A non-transitory computer-readable medium that stores a plurality of instructions that, when executed by a processor, implement a method for generating a shared key, the method comprising:
   establishing a key negotiation connection between a pair of terminals,
   determining an algorithm code by negotiating between the pair of terminals using the key negotiation connection, determining the algorithm code to include:
      sending the algorithm code from a first terminal to a second terminal of the pair of terminals using the key negotiation connection, sending the algorithm code to include:
         encrypting the algorithm code using a preset key to generate an encrypted algorithm code; and
         sending the encrypted algorithm code to the second terminal using the key negotiation connection;
      receiving information indicating if the algorithm code is agreed to from the second terminal; and
      selecting the algorithm code when the algorithm code is agreed to;
   searching for an algorithm corresponding to the algorithm code in a pre-stored algorithm library, and
   calculating a shared key using the algorithm and a pre-stored seed key, wherein the pre-stored seed key is used as a parameter of the algorithm.

15. The apparatus medium of claim 14, wherein establishing a key negotiation connection includes:
   sending a key negotiation request to the second terminal; and
   receiving response information indicating that the second terminal agrees with the key negotiation request.

16. The medium of claim 15, wherein the response information comprises authentication information, and the receiving response information indicating that the second terminal agrees with the key negotiation request comprises determining that the second terminal is valid based on the authentication information.

17. The medium of claim 14, further comprising:
   receiving a recommended algorithm code from the second terminal;
   acknowledging the recommended algorithm code; and
   sending to the second terminal information indicating that the recommended algorithm code is being used.

* * * * *